June 1, 1948.  S. E. SLATON  2,442,517
BUILDING BLOCK MOLDING PRESS
Filed July 2, 1945  3 Sheets-Sheet 1
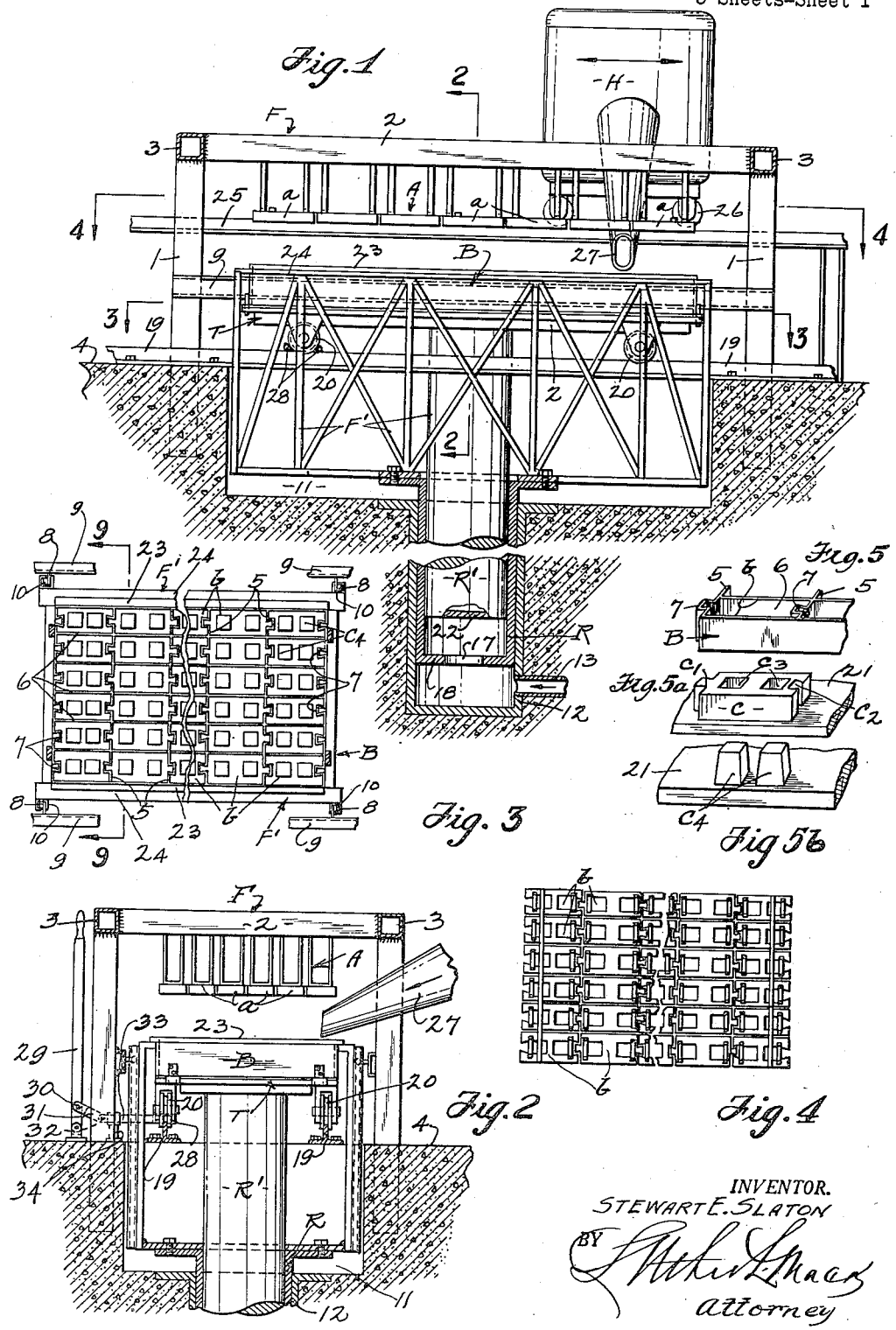
INVENTOR.
STEWART E. SLATON
BY
Attorney June 1, 1948.  S. E. SLATON  2,442,517
BUILDING BLOCK MOLDING PRESS
Filed July 2, 1945  3 Sheets-Sheet 2

INVENTOR.
STEWART E. SLATON
BY
Attorney

June 1, 1948. S. E. SLATON 2,442,517
BUILDING BLOCK MOLDING PRESS
Filed July 2, 1945 3 Sheets-Sheet 3

INVENTOR.
STEWART E. SLATON
BY
Attorney

Patented June 1, 1948

2,442,517

UNITED STATES PATENT OFFICE 2,442,517

BUILDING BLOCK MOLDING PRESS

Stewart E. Slaton, Roscoe, Calif., assignor to Loc-Bloc Corporation, Glendale, Calif., a corporation of California Application July 2, 1945, Serial No. 602,708

8 Claims. (Cl. 25—45)

This invention relates to and has for an object the provision of an improved means and method of molding building blocks, bricks, etc., whereby a maximum production may be accomplished at a minimum cost by simultaneously molding a large number of blocks or bricks in a single operation.

A particular object is to provide a molding apparatus in which a female mold having a multiplicity of cavities of the same or different characteristics may be moved into position adjacent a mixer and dispenser of materials to be molded for receiving requisite quantities of the material in all of the mold cavities, then moving the filled mold into molding position relative to a male mold member for compressing the material in the cavities, further moving the female mold member relative to the male member and stripping the female member from the then molded blocks which have been deposited upon a suitable portable or movable bed, and restoring the mold members to positions for another operation.

In the consideration of this invention it may be understood that, as far as I am informed, building blocks have been heretofore made, one or more at a time, but not more than a few at a time, by fixing a female mold member on a suitable bed, filling it with material and then advancing the male mold into molding engagement with the female mold and the contained material, and finally retracting the male mold and removing the molded blocks preparatory to a succeeding operation. Such operations require a maximum of manual effort, consume unnecessary time between operations, are slower and more costly and, therefore, more expensive than operations effected by the use of an automatic or at least a semi-automatic apparatus such as I have provided. Moreover, when the female mold is supported on a bed the movement of the male mold into the cavities is limited to the extent to which the material is compressible, and at the end of an operation the density of the molded blocks is such that it is difficult to strip the mold from the blocks, due to the friction between the material and the surfaces of the mold walls.

It is an object of this invention, accordingly, to provide an apparatus including a wheeled bed forming part of a female mold which is movable into position of registration with a companion male mold while empty and after the cavities thereof have been filled with a desired material is adapted to be elevated or moved otherwise into molding position relative to a fixedly supported male mold member, after which the bed with the female mold member and the contained material is bodily moved toward the male member to an extent sufficient to compress and mold the material, and means subsequently operable for lifting and simultaneously stripping a relatively movable member of the female mold from the molded articles while the bed remains stationary with its load of molded articles, then retracting the bed and removing it to a position where it may discharge its load, moving another bed into position of registration with the male mold member, lowering the female mold member into position on the new bed, filling the mold cavities again and repeating the aforesaid operation.

In the formation of building blocks, tiles and the like it is well known that blocks of different characteristics are required, such as corner blocks, full and half length blocks and ordinary blocks of brick-like form. In hollow walls wherein apertures in the blocks are provided for extending reinforcing rods therethrough, for ventilation or otherwise, the building blocks must be formed so that the apertures of blocks of different form and characteristics will register throughout the many courses of the blocks in a wall. Hence, it is an object to provide a molding apparatus which will comprehend the means for molding a substantial number of blocks of different configuration but in which all blocks will have apertures formed therein adapted for registration with blocks of different configuration, regardless of size, shape or design.

I prefer to employ hydraulic pressure for effecting the movement of the female mold relative to the male member and to apply such pressure in the form of two concentric rams, one of which is adapted to elevate the movable bed with the female mold and contained material into operative engagement with the male mold member and the other ram being operative for further elevating the female mold so as to strip the same from the molded material and to leave the molded articles on the bed, after which the loaded bed is removed, a new bed is inserted, the raised female mold is lowered onto the new bed and the apparatus is in readiness for a subsequent operation.

Another object is to provide a mold which will form the blocks or bricks with selectively positioned tongues or grooves on their ends or sides so that adjacent blocks may interlock. Other and more detailed objects will appear as the description of my improvements progresses.

I have shown a preferred form of apparatus embodying my improvements in the accompanying drawings, subject to modification, within the scope of the appended claims, without departing from the spirit of the invention.

In said drawings:

Fig. 1 is a side elevation of the apparatus, partly in section and with portions thereof mounted in a suitable pit below the surface of the ground;

Fig. 2 is a sectional elevation of the same on line 2—2 of Fig. 1;

Fig. 3 is a sectional plan on line 3—3 of Fig. 1;

Fig. 4 is a sectional plan on line 4—4 of Fig. 1;

Fig. 5 is a fragmentary perspective view of a portion of the female mold;

Fig. 5a is a perspective view of a block produced from the mold shown in Fig. 5;

Fig. 5b is a fragmentary perspective view of the truck bed arranged to support the female mold member and cores affixed to the bed for cooperation with the mold members for producing the blocks;

Figure 6:
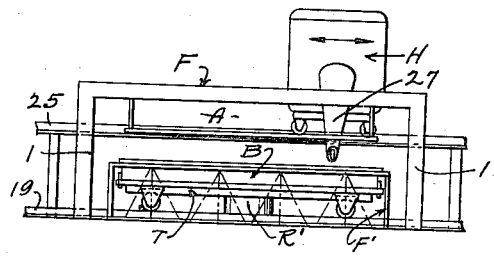
Fig. 6 is a reduced scale elevation of the apparatus above the level of the ground showing the same in position for an ensuing molding operation.
Figure 7:
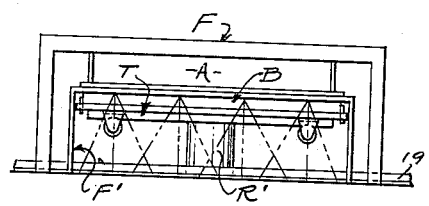
Fig. 7 is a similar view in elevation showing the female mold in operative engagement with the male mold member.

I provide an apparatus which is partly above and partly below the level of the ground or a suitable base and which includes a structural framework F arranged with corner posts 1, 1, etc. (preferably four in number), horizontal members 2, 2, and transverse members 3, 3 rigidly connected together at a suitable elevation above the surface 4. A male mold member A is attached to and depends from the top of frame F which comprises a plurality of sections a, a, etc., of like or different form, and are so contoured as to correspond to the form of the blocks to be cast. A female mold member B is reciprocably mounted below and for engagement and cooperation with the male mold member at times and includes a plurality of cavities b, b, etc., which are similarly contoured with respect to the portions a, a, etc., of the male member A, and are adapted to register with the male mold member throughout a molding operation. The cavities b are separated by metal partitions 5, 5, etc., extending transversely of member B and longitudinal partitions 6, 6, etc. Preferably, the transverse, and occasionally the longitudinal, partitions are formed with reentrant portions 7 so arranged as to form tongues or grooves, or both, on the molded blocks, as shown in Figs. 12 to 15 inclusive. The partitions 5 and 6 are free to pass upwardly thru spaces separating the portions (a) of the male mold.

Figure 8:
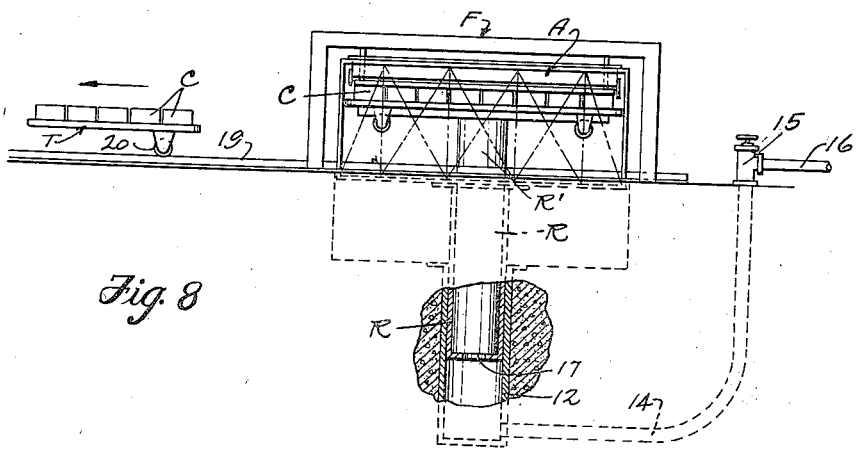
Fig. 8 is a similar view (with additions) showing the female mold after having completed a stripping operation and with the molded blocks deposited on the truck bed.
Figure 9:
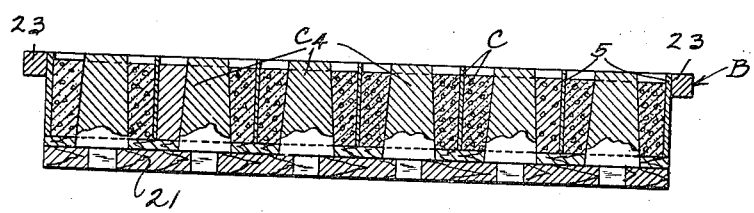
Fig. 9 is a sectional elevation of the female mold following a compression stroke whereby the material is compressed preparatory to a stripping operation, as seen on line 9—9 of Fig. 3.
Figure 10:
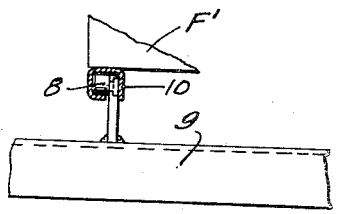
Fig. 10 is an enlarged detailed view of a portion of the lower left hand corner of the female mold and its supporting frame.

The mold member B is slidably supported on a frame F' for vertical movement on main frame F as by means of rollers 8 carried by bars 9, 9 attached to posts 1 of frame F, and guides 10 attached to frame F' (see Figs. 3 and 10.) Frame F' is at least partly mounted in a pit 11, and is supported on the upper end of a vertically operable ram R which operates in a subterranean cylinder 12. Hydraulic power is applied to the lower portion of cylinder 12 through an inlet 13 which is connected with a pipe 14 leading to a valve 15 and from thence through a pipe 16 to a source of pressure as shown in Fig. 8. Ram R has an orifice 17 in the bottom 18 thereof for admitting fluid pressure to the interior of ram R, for the purpose to be hereinafter described.

On the surface of the ground a pair of rails 19 are mounted for tractionally receiving wheels 20 of a truck T having a flat horizontally disposed bed 21 adapted to receive, and at times support, the female mold member B, and at other times to support the completely molded articles. Rails 19 straddle the ram R so that the truck T may be moved into position beneath the male mold member A with the female member thereon and said rails also span the pit 11.

Internally of ram R is a slightly smaller ram R' which slides in ram R and is closed at its bottom 22 and the upper end of which is adapted to engage the bed 21 and lift truck T with the member B thereon into operative engagement with member A, and upon proper compression of the materials in the cavities of member B the ram R then becomes effective for lifting the member B off of the bed 21 and thereby stripping the blocks from member B, as explained in more detail hereinafter. Member B has flanges 23 which overlie portions 24 of frame F' so that member B may be elevated to a desired extent by ram R beyond the extent of movement of bed 21 occasioned by ram R'.

Rails 25 are provided on frame F for movably supporting a hopper H having wheels 26 thereon and a delivery spout 27 disposed above the member B when said member is in its lowermost plane, as shown in Fig. 1. Thus, the hopper may be moved over the open mold cavities of member B to an extent to supply a plastic material to the cavities, and as by means of a straight edge the material in the cavities may be uniformly distributed to a common level preparatory to an ensuing molding operation.

As shown in Figs. 1 and 2 the truck T may be locked in position as by means of a pair or more of shoes 28 adapted to overlie at least one of the rails 19 when laterally moved into position as by means of a hand lever 29 which is connected at 30 to a toggle link 31 which is in turn connected at 32 to a sliding bar 33 supported in a suitable bearing 34 affixed to frame F'. Thus, when the handle 29 is pulled outwardly (to the left, as seen in Fig. 2), the shoes 28 will be moved out of the plane of a wheel 20, so that the truck may be removed from its position shown in Fig. 1. When reversely moved the handle will position the shoes so that one shoe will rest on each side of a wheel 20 and prevent the dislodgement of the truck from operative position.

Figure 11:
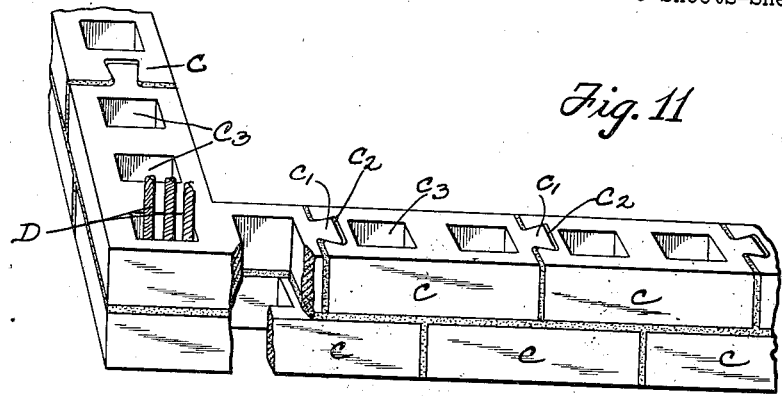
Fig. 11 is a perspective view of a portion of wall formed with blocks molded by my apparatus.
Figure 12:
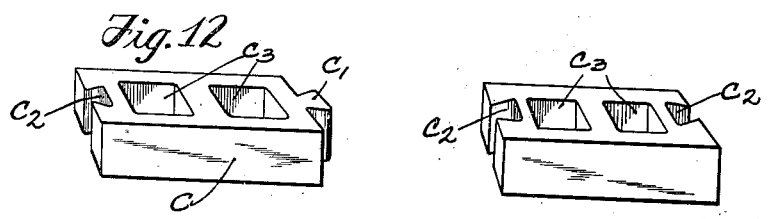
Figs. 12, 13, 14 and 15 are perspective views of some forms of blocks capable of being molded by my apparatus.
Figure 13:
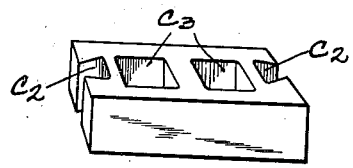
Figure 14:
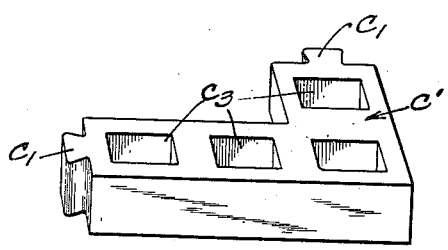
Figure 15:
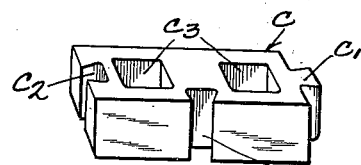

As shown in detail in Fig. 5a, a block of molded material C, for instance, is formed by one of the cavities $b$ of member B, and may have a tongue $C_1$ on one end thereof, and a correspondingly formed groove $C_2$ on its opposite end, together with a pair of apertures $C_3$ extending therethrough, through which, as shown in Fig. 11, reinforcing rods D may be vertically extended when the blocks are laid in courses, as on a wall structure. Said apertures are formed by cores $C_4$ which are preferably attached to the upper surface of the truck bed 21, as shown in Fig. 5b. Different forms of blocks are shown in Figs. 12, 13, 14 and 15, with tongues and grooves differently positioned on the ends or sides, and both, and in Fig. 14 representing a corner block adapted to match with other forms of blocks. In all cases, however, the apertures $C_3$ are so positioned that regardless of the specific form of blocks in different courses of a structure the apertures will register so that the rods D may be extended therethrough and a cementitious bond may be used to fill the apertures, if desired, or if not, air spaces will be provided in a wall by reason of the apertures.

Figure 16:
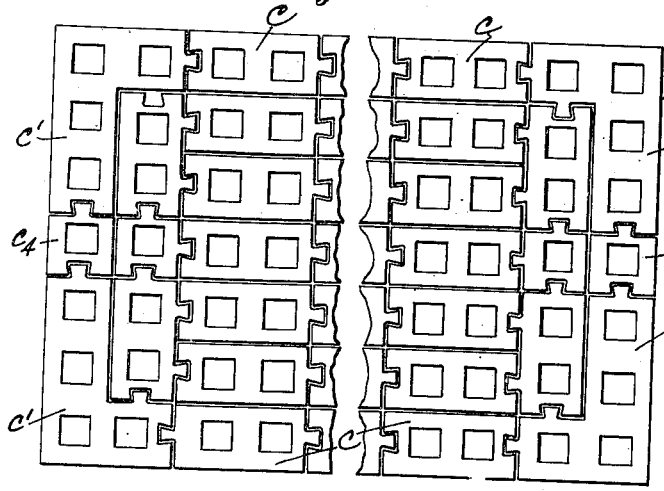
Fig. 16 is a typical top plan view of a mold, showing different forms of blocks adapted to be molded by the apparatus.

In Fig. 16 I have shown a practicable design for a mold which is capable of producing a plurality of blocks of different form and characteristics in a single operation, such as the form designated at C in Fig. 5a, C' of Fig. 14, half blocks $C_4$ and modifications of any or all of such illustrated forms, with tongues or grooves, or either or both, on one or more sides or ends, depending upon a particular arrangement of blocks desired to provide a given structure.

It will be noted that the frame F' which supports the mold member B is trussed so that the pressure applied to the truck bed and the mold will be as nearly uniform as possible throughout their respective areas.

In operation, when a truck T is moved into position for a molding operation and locked by handle 29, the female mold B is filled with material to a uniform depth by moving the hopper H to a necessary extent and levelling the material as by means of a straight edge moved over the upper edges of the mold partitions. The hopper H is then moved out of position over the female mold and the control valve 15 is then opened to apply pressure through pipe 14 to the bottom of cylinder 12 and the rams R and R' are thereby raised, until the mold B has ascended to a point whereat the material in the mold cavities is completely compressed, whereupon the ascent of the inner ram R' will cease but the ram R will continue to ascend until the mold member B has been stripped from the molded blocks.

At the completion of an upward stroke of mold member B the control valve 16 is operated to relieve the pressure beneath the rams R and R' so that said rams with their loads may descend with the member B spaced upwardly from the bed 21 of the truck T and following the truck. When ram R' has descended sufficiently the truck will be deposited upon the tracks 19. At such time, valve 16 may be closed until the truck has been removed from position as shown in Fig. 8 and the molded blocks removed therefrom and the truck returned to position, or a second truck moved into position beneath the mold member B after the first has been removed in order that the then elevated member B may be lowered onto the truck bed by operation of valve 16 as ram R descends to its lowermost position. Subsequent operations are similarly performed. Valve 16 merely symbolizes a suitable control for the rams and may be of a two-way type so that liquid from cylinder 12 may be discharged therethrough as well as admitted to said cylinder through the valve or a second valve, such details not being material to my invention, inasmuch as hydraulic lifts are well known and the characteristics of my apparatus may be similar to or different from the usual controls for such lifts. The relative effective areas of rams R and R' may be varied by changing the size of the orifice 17 in ram R.

Thus, summarizing the operational cycles it will be noted that the truck and female mold member ascend together until the end of a compression cycle, following which the truck remains stationary while the female mold member is further raised until its lower edges have cleared the tops of the then molded blocks in a stripping cycle, and the truck and mold member are then lowered together with the mold member substantially above the truck bed until the truck is deposited upon the tracks 19, and finally the truck with load of blocks is removed and returned to its original position and the mold B is lowered into position thereupon for another operation.

I claim:

1. A molding apparatus comprising: a stationary mold member, a relatively movable mold member complementary to the stationary mold member, a bed movable to and out of position for at times supporting the movable mold member and at times for supporting the molded articles, and means for separately applying power to said bed and said movable mold member for correspondingly moving the bed and the movable mold member to molding position relative to the stationary mold member and thereafter moving the movable mold member while the bed is held stationary for stripping the relatively movable mold member from the molded articles, and finally retracting the bed and the relatively movable mold member together for a given distance and independently to permit the discharge of the molded articles from the bed and the positioning of the relatively movable mold member on the bed for an ensuing operation, said means having a pair of concentric telescoping rams mounted in a common cylinder and operatively connected, respectively, with said bed and said relatively movable mold member for differentially applying pressure from a source to the bed and relatively movable mold member, and means for controlling the application of pressure to said rams.

2. A molding apparatus as characterized in claim 1, and in which, the innermost ram is operatively engageable with the movable bed, a frame carried by the outermost ram having portions engaged with marginal portions of the relatively movable mold member and guides alined with the axis of the rams for movably supporting the movable mold member in alinement with the fixed mold member.

3. A molding apparatus as characterized in claim 1, including: guides on which said bed is movable to and from operative position between the mold members, and manually operable means adjustable relative to said guides for locking the bed in fixed position on the guides during a molding operation.

4. A molding apparatus comprising: a stationary mold member, a relatively movable mold member complementary to the stationary mold member, a bed movable to and out of position for at times supporting the relatively movable mold member and at times for supporting the molded articles, and means for separately applying power to said bed and said relatively movable mold member for correspondingly moving the bed and the relatively movable mold member to molding position relative to the stationary mold member and thereafter moving the relatively movable mold member while the bed is held stationary for stripping the relatively movable mold member from the molded articles, and finally retracting the bed and the movable member together for a given distance and independently to permit the discharge of the molded articles from the bed and the positioning of the movable mold member on the bed for an ensuing operation, said means having a pair of concentric telescoping rams mounted in a common cylinder and operatively connected, respectively, with said bed and said movable member for differentially applying pressure from a source to the bed and mold member, and means for controlling the application of pressure to said rams, means for supporting and guiding the relatively movable mold member in alinement with the fixed mold member and attachable to one of said rams, and means for guiding the movable bed into and out of position for at times supporting the movable mold member.

5. A molding apparatus comprising: a stationary male mold member, a relatively movable female mold member complementary to the stationary mold member, a bed movable to and out of position for at times supporting the relatively movable mold member and at times for supporting the molded articles, and means for separately applying power to said bed and said relatively movable mold member for correspondingly moving the bed and the relatively movable mold member to molding position relative to the stationary mold member and thereafter moving the relatively movable mold member while the bed is held stationary for stripping the relatively movable mold member from the molded articles, and finally retracting the bed and the relatively movable mold member together for a given distance and independently to permit the discharge of the molded articles from the bed and the positioning of the relatively movable mold member on the bed for an ensuing operation, said means including a pair of concentric telescoping rams mounted in a common cylinder and operatively connected, respectively, with said bed and said relatively movable mold member for differentially applying pressure from a source to the bed and relatively movable mold member, and means for controlling the application of pressure to said rams, means for supporting and guiding the relatively movable mold member in alinement with the stationary mold member and attachable to one of said rams, and means for guiding the movable bed into and out of position for at times supporting the movable mold member, and means for locking the bed in operative position.

6. A molding apparatus as characterized in claim 5 including: a frame on which the stationary male mold member is supported, guide rails on said frame, a material hopper adjustable thereon for supplying material to the cavities of the female mold unit and a spout for guiding material from said hopper into said cavities.

7. A molding apparatus, as characterized in claim 1, including: a frame, the stationary mold member forming a male mold element secured to said frame, and the relatively movable mold element forming a female mold element cooperating with said male mold elements; a hopper movably mounted on said frame and containing moldable material; and means for directing moldable material from said hopper into the female mold member, while the latter is supported on said bed.

8. A molding apparatus, as characterized in claim 5, in which the female mold member is formed with partitions extending longitudinally and transversely and positioned to pass upwardly to the male mold member, and formed to cooperate with the male mold unit to form blocks of predetermined shape in a single molding operation.

STEWART E. SLATON.

REFERENCES CITED

The following references are of record in the file of this patent:

UNITED STATES PATENTS

| Number | Name | Date |
| --- | --- | --- |
| 1,129,001 | Nesetril | Feb. 16, 1915 |
| 1,429,459 | Schol | Sept. 19, 1922 |